(12) United States Patent
Therriault

(10) Patent No.: US 6,598,826 B1
(45) Date of Patent: Jul. 29, 2003

(54) VEHICLE TIRE HOSE GUIDE DEVICE

(76) Inventor: Allan Therriault, 4015 Mountain Dr., Space #23, San Bernardino, CA (US) 92407

( * ) Notice: Subject to any disclaimer, the term of this patent is extended or adjusted under 35 U.S.C. 154(b) by 0 days.

(21) Appl. No.: 10/066,153

(22) Filed: Jan. 30, 2002

Related U.S. Application Data

(60) Provisional application No. 60/266,213, filed on Feb. 2, 2001.

(51) Int. Cl.[7] ............................................... B65H 57/00
(52) U.S. Cl. ................. 242/615; 242/615.4; 242/157 R
(58) Field of Search .................. 242/615, 615.3, 242/615.4, 157 R; 137/377; 248/75, 352; 138/110

(56) References Cited

U.S. PATENT DOCUMENTS

| | | | | |
|---|---|---|---|---|
| 1,556,327 A | * | 10/1925 | Hughes | |
| 1,914,743 A | * | 6/1933 | Hughes | |
| 2,603,432 A | * | 7/1952 | Paulsen | |
| 2,814,460 A | * | 11/1957 | Marcolongo | |
| 3,097,827 A | * | 7/1963 | McDaniel | |
| 3,984,732 A | * | 10/1976 | Podrecca | |
| 4,404,925 A | * | 9/1983 | Louwsma | |
| 4,778,135 A | * | 10/1988 | Legard | |
| 4,836,432 A | * | 6/1989 | Violette | |
| 4,895,225 A | * | 1/1990 | Parnell | |
| 5,427,209 A | * | 6/1995 | Tannehill et al. | |
| 5,427,339 A | * | 6/1995 | Pauli et al. | |
| 5,853,142 A | * | 12/1998 | Anderson | |
| D432,902 S | * | 10/2000 | Thiel | |

\* cited by examiner

*Primary Examiner*—William A. Rivera
(74) *Attorney, Agent, or Firm*—Joseph N. Breaux

(57) ABSTRACT

A vehicle tire hose guide device that includes a smooth molded plastic member having a curved tire receiving channel along one side and a smooth hose guide surface on an opposite side. The curved tire receiving channel has resilient arms extending outwardly therefrom for gripping the rim of a vehicle wheel assembly to hold the vehicle tire hose guide device in connection with the tire such that when an air or water hose is pulled around the vehicle, the smooth hose guide surface allows the hose to be smoothly pulled around the tire without becoming jammed between the tire and the ground surface.

1 Claim, 3 Drawing Sheets

VEHICLE TIRE HOSE GUIDE DEVICE

This application claims the benefit of provisional application Ser. No. 60/266,213 filed Feb. 2, 2001.

TECHNICAL FIELD

The present invention relates to vehicle accessories and more particularly to a vehicle tire hose guide device that includes a smooth molded plastic member having a curved tire receiving channel along one side and a smooth hose guide surface on an opposite side; the curved tire receiving channel having resilient arms extending outwardly therefrom for gripping the rim of a vehicle wheel assembly to hold the vehicle tire hose guide device in connection with the tire such that when an air or water hose is pulled around the vehicle, the smooth hose guide surface allows the hose to be smoothly pulled around the tire without becoming jammed between the tire and the ground surface.

BACKGROUND ART

It is often necessary when working around a vehicle to pull a water or air hose from one side of the vehicle to the other. Attempting to do this without first pulling a large amount of the hose away from the vehicle often results in the hose becoming lodged between one of the tires and the ground surface. This can be bothersome, time consuming, and can cause damage to the hose when the person repeatedly pulls on the hose in an attempt to free it. It would be a benefit, therefore, to have a device that could be secured to a tire that would provide a smooth hose guide surface that would smoothly guide the hose around the tire allowing a person to easily pull an air or water hose round the vehicle without the risk of having the hose become jammed between a tire and the ground.

GENERAL SUMMARY DISCUSSION OF INVENTION

It is thus an object of the invention to provide a vehicle tire hose guide-device that includes a smooth molded plastic member having a curved tire receiving channel along one side and a smooth hose guide surface on an opposite side; the curved tire receiving channel having resilient arms extending outwardly therefrom for gripping the rim of a vehicle wheel assembly to hold the vehicle tire hose guide device in connection with the tire such that when an air or water hose is pulled around the vehicle, the smooth hose guide surface allows the hose to be smoothly pulled around the tire without becoming jammed between the tire and the ground surface.

Accordingly, a vehicle tire hose guide device is provided. The vehicle tire hose guide device includes a smooth molded plastic member having a curved tire receiving channel along one side and a smooth hose guide surface on an opposite side; the curved tire receiving channel having resilient arms extending outwardly therefrom for gripping the rim of a vehicle wheel assembly to hold the vehicle tire hose guide device in connection with the tire such that when an air or water hose is pulled around the vehicle, the smooth hose guide surface allows the hose to be smoothly pulled around the tire without becoming jammed between the tire and the ground surface.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
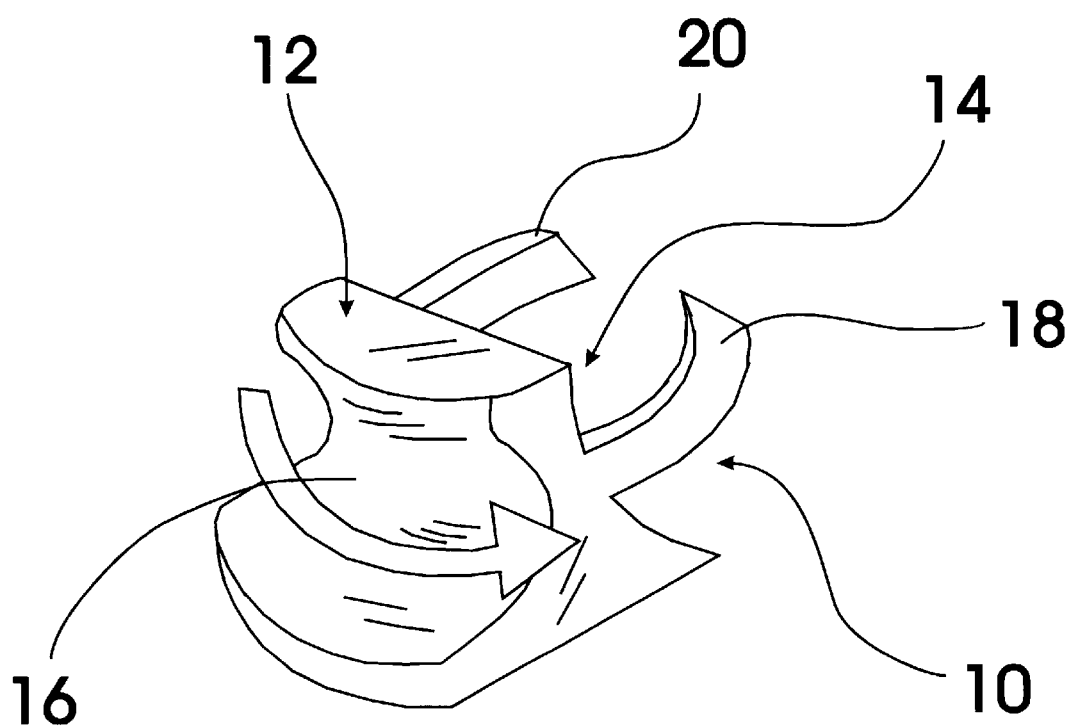
FIG. 1 is a perspective view of an exemplary embodiment of the vehicle tire hose guide device of the present invention.
Figure 2:
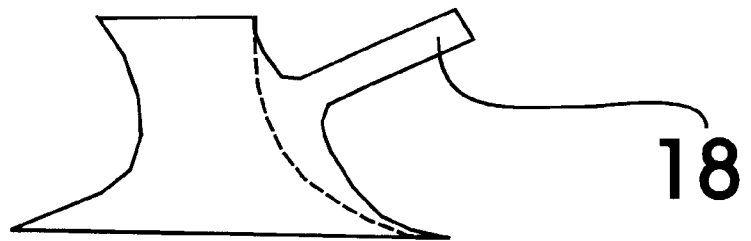
FIG. 2 is a side plan view of the vehicle tire hose guide device.
Figure 3:
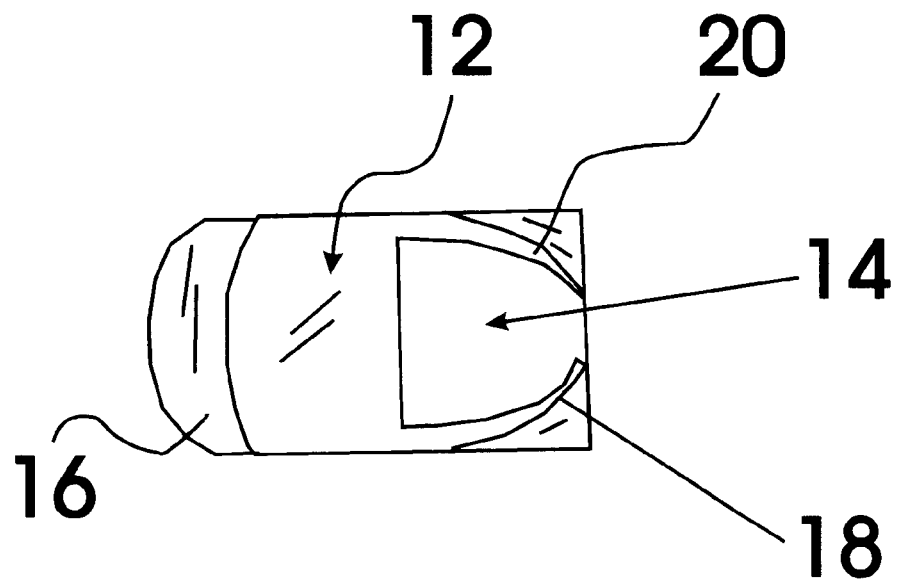
FIG. 3 is a top plan view of the vehicle tire hose guide device.
Figure 4:
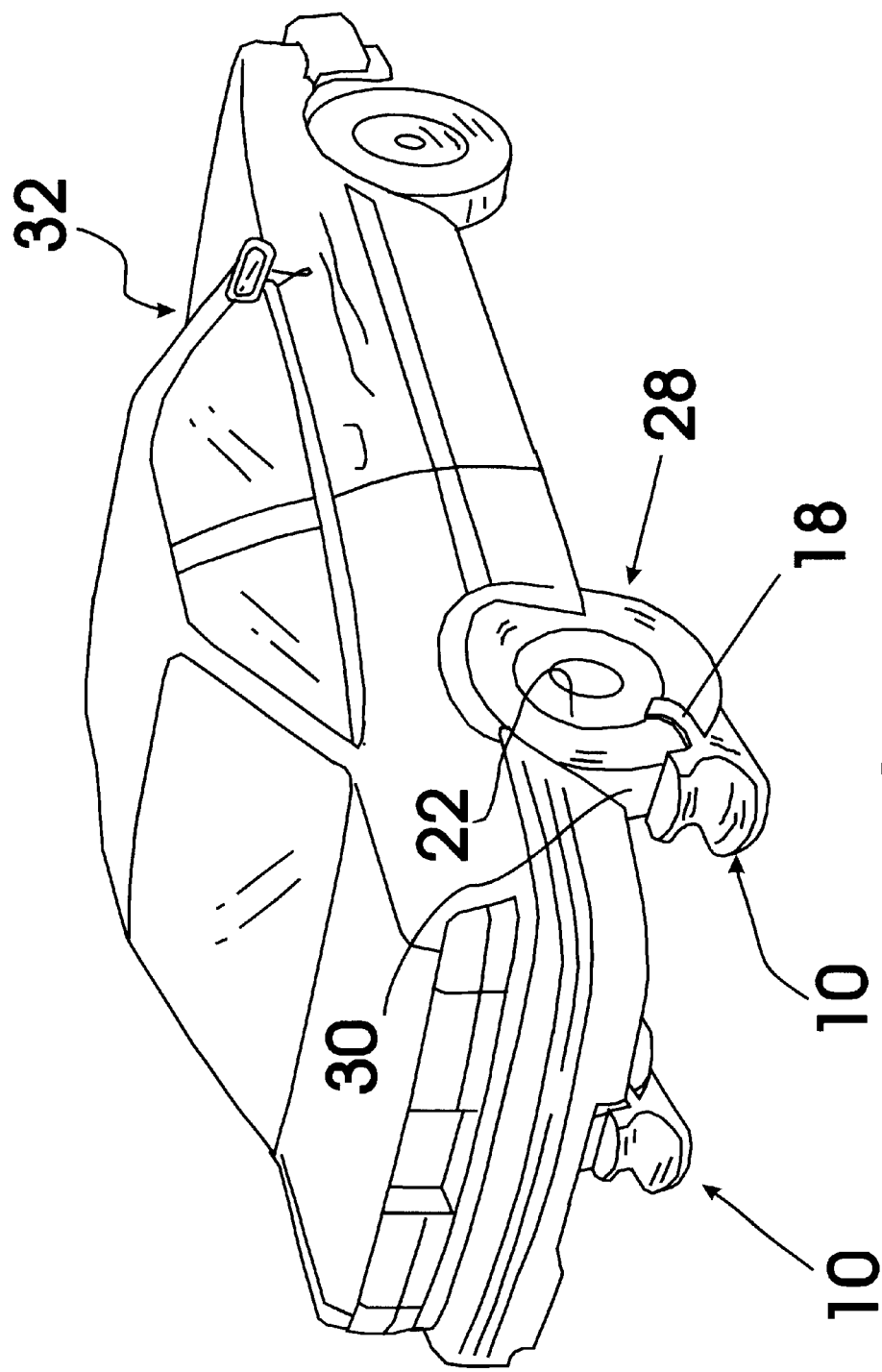
FIG. 4 is a perspective view of two of the vehicle tire hose guide devices in use on the two rear tires of a representative vehicle.

FIGS. 1–4 show various aspects of an exemplary embodiment of the vehicle tire hose guide device of the present invention generally designated 10. Vehicle tire hose guide device 10 includes a smooth molded plastic member, generally designated 12 having a curved tire receiving channel, generally designated 14, along one side and a smooth hose guide surface 16 on an opposite side. Curved tire receiving channel 14 has two spaced, resilient arms 18,20 extending outwardly therefrom for gripping the rim 22 of a vehicle wheel assembly, generally designated 28, to hold the vehicle tire hose guide device 10 in connection with the tire 30 such that when an air or water hose is pulled around the vehicle 32, the smooth hose guide surface 16 allows the hose to be smoothly pulled around the tire 30 without becoming jammed between the tire 30 and the ground surface.

It can be seen from the preceding description that a vehicle tire hose guide device has been provided.

It is noted that the embodiment of the vehicle tire hose guide device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. The vehicle tire hose guide device comprising:
    a smooth molded plastic member having a curved tire receiving channel along one side and a smooth hose guide surface on an opposite side;
    the curved tire receiving channel having resilient arms extending outwardly therefrom and gripping the rim of a vehicle wheel assembly to hold the vehicle tire hose guide device in connection with the tire such that when an air or water hose is pulled around the vehicle, the smooth hose guide surface allows the hose to be smoothly pulled around the tire without becoming jammed between the tire and the ground surface.

* * * * *